United States Patent
Moton, Jr. et al.

(10) Patent No.: US 12,469,092 B2
(45) Date of Patent: Nov. 11, 2025

(54) MOBILE DEVICE CROSS-SERVICE BROKER

(71) Applicant: AT&T Intellectual Property I, L.P., Atlanta, GA (US)

(72) Inventors: Robert T. Moton, Jr., Alpharetta, GA (US); Adrianne Binh Luu, Atlanta, GA (US); James Pratt, Round Rock, TX (US); Barrett Kreiner, Woodstock, GA (US); Walter Cooper Chastain, Atlanta, GA (US); Ari Craine, Marietta, GA (US); Robert Koch, Peachtree Corners, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 507 days.

(21) Appl. No.: 17/348,376

(22) Filed: Jun. 15, 2021

(65) Prior Publication Data
US 2022/0398677 A1 Dec. 15, 2022

(51) Int. Cl.
*G06Q 50/14* (2012.01)
*G06Q 10/02* (2012.01)
(Continued)

(52) U.S. Cl.
CPC .............. *G06Q 50/14* (2013.01); *G06Q 10/02* (2013.01); *G06Q 10/025* (2013.01); *G06Q 10/06312* (2013.01); *H04W 12/02* (2013.01)

(58) Field of Classification Search
CPC ....... G06Q 10/025; G06Q 10/02; G06Q 50/14
See application file for complete search history.

(56) References Cited

U.S. PATENT DOCUMENTS 10,697,784 B1 * 6/2020 Li ..................... H04W 4/027
2003/0225600 A1 12/2003 Silvka et al.
(Continued)

FOREIGN PATENT DOCUMENTS

WO 2016181193 A1 11/2016

OTHER PUBLICATIONS

Loannou et al., "That's Private! Understanding Travelers' Privacy Concerns and Online Data Disclosure," Journal of Travel Research, Sep. 11, 2020. Retrieved from https://journals.sagepub.com/doi/full/10.1177/0047287520951642 (Year: 2020).*
(Continued)

*Primary Examiner* — Shannon S Campbell
*Assistant Examiner* — Bryan J Kirk

(57) ABSTRACT

A processing system may determine a plurality of aspects of a trip of a user, each of the plurality of aspects associated with a travel service provider of a plurality of travel service providers, identify a plurality of travel service provider applications that are available on the mobile computing device and that are associated with the plurality of travel service providers, and obtain an authorization of the user of the mobile computing device to interact with the plurality of travel service provider applications in connection with the trip. The processing system may then detect an event associated with the trip and perform, in response to detecting the event, at least one task via a second travel service provider application using a first set of data from at least a first of the plurality of travel service provider applications, where the second travel service provider application is available on the mobile computing device.

20 Claims, 5 Drawing Sheets

(51) Int. Cl.
G06Q 10/0631 (2023.01)
H04W 12/02 (2009.01)

(56) References Cited

U.S. PATENT DOCUMENTS

| | | | | |
|---|---|---|---|---|
| 2010/0228577 | A1* | 9/2010 | Cunningham | G06Q 10/02 715/764 |
| 2014/0316826 | A1* | 10/2014 | Nicoara | G06Q 30/0635 705/26.81 |
| 2018/0013823 | A1* | 1/2018 | Bakhtyari | H04L 67/025 |
| 2020/0285936 | A1* | 9/2020 | Sen | G06Q 50/40 |
| 2021/0004770 | A1* | 1/2021 | Bansal | G06F 9/453 |
| 2021/0185046 | A1* | 6/2021 | Gupta | H04L 67/1095 |

OTHER PUBLICATIONS

"How to Integrate Airport Transfer and Shuttle Functionality with Hotel and Flight Booking Systems", Altexsoft, May 15, 2018, downloaded from https://www.altexsoft.com/blog/travel/how-to-integrate-airport-transfer-and-shuttle-functionality-into-hotel-and-flight-booking-systems/, 10 pages.

"Seamless Travel Communication: How APIs Streamline Itinerary Changes", Vonage Staff, downloaded from https://www.vonage.com/resources/articles/seamless-travel-communication-api-itinerary-changes/ on Apr. 27, 2021, 6 pages.

* cited by examiner

FIG. 2

USER RECORD 200

STABLE DATA 205

| | |
|---|---|
| NAME | J. JONES |
| TRAVELER NUMBER | XYZ123 |
| CREDIT CARD | **** **** **** 1234 |
| EMERGENCY CONTACT | F. JONES |
| SEAT PREFERENCE | AISLE |
| ADDRESS | 123 MAIN STREET |
| PHONE NUMBER | 555-555-5555 |
| EMAIL | JJONES@EXAMPLE.COM |

TRANSIENT DATA 210

| | |
|---|---|
| FLIGHT | ABC123 |
| DATE | 1 APR 2021 |
| ORIGIN | ATL |
| DESTINATION | DFW |
| DEPART TIME | 12:01 PM |
| ARRIVE TIME | 12:43 PM |
| DEPARTURE GATE | 24 |
| BAGGAGE CLAIM | 3 |
| SEAT | 12A |

MOBILE DEVICE CROSS-SERVICE BROKER

The present disclosure relates generally to transportation service provider applications and systems (e.g., transportation management systems, including booking and reservation systems, fleet management systems, or the like) and more particularly to methods, computer-readable media, and apparatuses for performing at least one task via a second travel service provider application using a first set of data from at least a first travel service provider application available on a mobile computing device of a user in response to detecting an event associated with a trip of the user.

BACKGROUND

Various travel and transportation applications (apps) provide users with the ability to browse and book/reserve flights, hotels, rental cars, or vacation packages. An airline may provide an airline app via which a user may reserve a one way or round-trip flight. In addition, the airline app may enable the downloading of an e-ticket, which can be presented on a screen of a mobile device to be used to check-in and board a flight. Similarly, a hotel app may enable a user to reserve one or more rooms of a hotel in connection with a trip. The hotel app may also provide a barcode, quick response (QR) code or the like, which may be used to check-in via the user's mobile device when arriving at the hotel. For a vacation package, often the different components of the trip may be with preferred vendors associated with the app provider. For instance, a rental car may also be reserved via an airline app. However, the airline app may only have certain rental car vendors with which the airline app can book a package including a rental car (or may have preferred rates to steer users towards particular vendors).

SUMMARY

In one example, the present disclosure describes a method, non-transitory computer-readable medium, and mobile computing device for performing at least one task via a second travel service provider application using a first set of data from at least a first travel service provider application available on a mobile computing device of a user in response to detecting an event associated with a trip of the user. For instance, in one example, a processing system including at least one processor may determine a plurality of aspects of a trip of a user, each of the plurality of aspects associated with a travel service provider of a plurality of travel service providers, identify a plurality of travel service provider applications that are available on the mobile computing device and that are associated with the plurality of travel service providers, and obtain an authorization of the user of the mobile computing device to interact with the plurality of travel service provider applications in connection with the trip. The processing system may then detect an event associated with the trip and perform, in response to the detecting the event, at least one task via a second travel service provider application using a first set of data from at least a first travel service provider application of the plurality of travel service provider applications, where the second travel service provider application is available on the mobile computing device.

BRIEF DESCRIPTION OF THE DRAWINGS

The teachings of the present disclosure can be readily understood by considering the following detailed description in conjunction with the accompanying drawings, in which:

FIG. 2 illustrates an example user record of a user associated with a travel service provider application, in accordance with the present disclosure;

To facilitate understanding, identical reference numerals have been used, where possible, to designate identical elements that are common to the figures.

DETAILED DESCRIPTION

Figure 1:
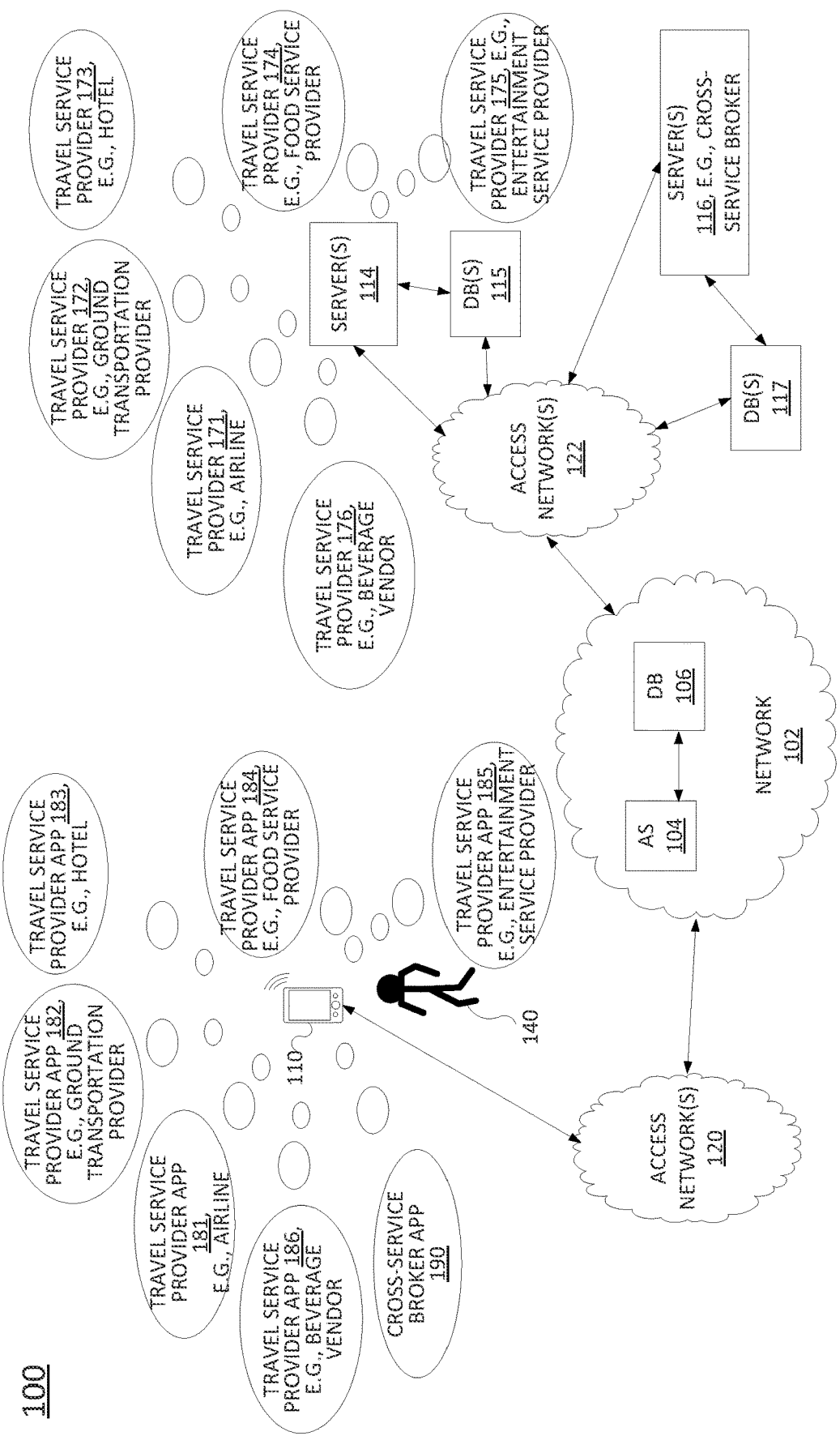
FIG. 1 illustrates an example system comprising one or more communication networks related to the present disclosure.

Examples of the present disclosure describes a cross-service broker application that serves as a single interface on a user's mobile computing device for the user to manage issues arising in connection with a trip that involves a set of travel service providers. The set of travel service providers provides a collective service, e.g., the trip for the user, including various aspects of the trip such as transit legs of the trip, accommodations, meals, entertainment, or other events, such as conference space for meetings, and so forth. Thus, various travel service providers may include airlines, taxi providers or other ride sharing providers, passenger rail operators, bus services, car rental services, hotels, restaurants, coffee shop chains, medical service providers such as pharmacies, and others, which may combine services for various aspects of the trip to provide the collective service.

Across a journey, a user may rely on several travel service providers to provide a collective service (the end-to-end trip experience). However, to interact with the travel service providers, the user typically needs to do so individually with each travel service provider. For instance, the user may have a separate application installed on the user's mobile computing device for each travel service provider. In accordance with the present disclosure, a cross-service broker (CSB) application on the user's mobile computing device provides a single interface for the user and links together the data and logic of the relevant service transportation service provider applications for a temporary period of time in order to provide a collective service across all of the travel service providers involved during the trip.

A user may be equipped with a mobile computing device such as a wireless smart phone. The mobile computing device may be equipped with one or more applications (apps), each app corresponding to an individual travel service provider. Furthermore, the mobile computing device may be equipped with a cross-service broker app, which may communicate with each of the other travel service provider apps on the mobile computing device via an application programming interface (API) or standard interface. The user may use each of the travel service provider apps individually, and may also interact with the cross-service broker app. In one example, the user interface to the cross-service broker app may be that of a virtual assistant, such as a speech/voice command-based interface. Alternatively, the user may interact using an input interface such as text or graphical user interface (GUI). There may exist a server instance for each app, and also a database for each app to house data such as profile data, reservation data, usage data, and so forth for each user.

To illustrate, each travel service provider app may have access to and utilize a user profile/customer profile, e.g., maintained respective databases associated with servers of the different travel service providers. For instance, each user profile may include relatively stable data that does not vary frequently over time, such as the user's name, address, credit card number, contact information, and similar data. Each user profile may also include transient data. This data may include data that is specific to the collective service that is being provided during a temporary period of time. For instance, this transient data may include events, reservations, and other information related to the period of time during which the user will be on the trip.

In accordance with the present disclosure, the travel service provider apps and the corresponding travel service provider servers do not interact with one another directly. Rather, the cross-service broker app provides a single point of interaction for the user and the various travel service provider apps. For example, the user may grant permission to the cross-service broker app to access and interact with each of the pertinent travel service provider apps that are associated with the collective service, e.g., the user's trip. For instance, the user may grant this permission to the cross-service broker app (or "trip manager" app) to access information and data for each of the individual travel service provider apps when setting up the collective service (e.g., when arranging the trip) during a particular limited period of time.

By providing a single point of access for the user, and a broker function, the user's data for each of the individual travel service provider applications is kept private from the other travel service providers. In this way, the user does not necessarily need to specify which travel service provider app needs to be invoked to perform a task or to solve a problem related to the trip. Instead, the cross-service broker may ascertain the responsibilities and relationships among the travel service provider apps throughout the trip. Thus, each individual travel service provider app maintains relevant information for the customer related to an aspect of the trip associated with the particular travel service provider, while the cross-service broker app manages issues across the travel service provider apps. As such, examples of the present disclosure advance present technologies of transportation service provider applications and systems (e.g., transportation management systems, including booking and reservation systems, fleet management systems, and similar travel and transportation related systems).

Using a speech interface as an example, the user may invoke the cross-service broker app using a recognized phrase. For example, the user may invoke the cross-service broker app to manage arrangements for ground transportation as the user is arriving at a location after a flight. For example, the user may ask the cross-service broker app to arrange for a ride sharing service and, separately, delivery of the user's luggage to a hotel room. For instance, the user adding the ride sharing service and the delivery of the luggage may comprise "events" that are associated with at least one aspect of the trip, or a new aspect added to the trip. In order to access the data needed to perform these tasks, the cross-service broker app may access one or more of the user's travel service provider apps to obtain necessary data. In one example, the cross-service broker app may also need to access data from the travel service provider servers (e.g., via the travel service provider apps on the user's mobile computing device; collectively a travel service provider app and corresponding travel service provider server(s) may be referred to as a "travel service provider system"). For instance, to execute the request to arrange for the ride sharing service, the cross-service broker app may access estimated time of arrival information for the user's flight (e.g., from an airline app), as well as the user's ride-share service app in order to arrange for a pick up at the airport at the appropriate time. Similarly, the cross-service broker app may access the user's hotel app and airline app to arrange for the delivery of the luggage, e.g., such that an instruction is sent to the airline app to deliver the user's luggage to the hotel at which the user has a reservation, or to tender the luggage to a vehicle to be sent by the hotel to pick up the luggage at the airport, for instance.

In a similar way, the cross-service broker app may initiate an interaction dialog with the user in response to a detected event associated with the trip. As an example, the cross-service broker app may determine, via access to data related to the trip across various travel service providers, that the user needs to return from an excursion to a cruise ship in order to make it back on time before the ship departs. To illustrate, the cross-service broker app may obtain an alert via the cruise ship app of a departure time. The cross-service broker app may then interpret the ship's departure time in relation to the location of the user, traffic conditions, and other conditions that the cross-service broker app may access in order to determine that the user needs to act immediately to allow time for a taxi or similar ride-share vehicle to arrive and transport the user back to the cruise ship before the departure of the cruise ship. The user may thus confirm that the cross-service broker app is authorized to arrange for the pick-up via the ride-share service app of the user's mobile computing device.

In one example, a situation may arise whereby another travel service provider, not initially indicated by the user to be part of the collective service for the trip, may participate in providing a new/added aspect of the trip. For instance, the user's location (e.g., the location of the user's mobile computing device) may be identified, and a nearby location of the additional travel service provider may be identified as being able to serve the customer. For instance, a coffee shop app of the user's mobile computing device may detect that a coffee shop location is nearby in an airport. The coffee shop app may alert the cross-service broker app to ask the user if the user would like for the coffee shop app to be permitted to provide an additional service during the trip. If the user agrees, the cross-service broker app may add the coffee shop app to the set of travel service provider apps serving the user during the trip and across which data may be shared. In an illustrative example, the cross-service broker app may utilize data from the airline app in interacting with the coffee shop app, such as placing an order with a deadline as to when the product (e.g., beverage and/or food) is to be ready to ensure the user is not late boarding a flight. In addition, the cross-service broker app may obtain data from the coffee shop app, such as an order number, the quantity and type of items (e.g., large coffee with milk) and provide this data to the airline app in order to have the user's order sent to the departure gate waiting area associated with the user at the right time (e.g., thereby even allowing an airline staff to forward this product to the correct airline seat if the user has already boarded the aircraft if such a service is permitted by the airline, e.g., as a premium service offered by the airline staff).

The end of the collective service (the trip) may be defined by a preset time, by the user declaring the trip to be over (e.g., via a speech input or other input), by detecting that the user has arrived at a destination indicative of the end of the trip (e.g., arriving back at home after having been away for 48 hours, a week, etc.). In one example, upon the determination of the end of the trip, the cross-service broker app may disassociate all of the travel service provider apps that were temporary associated with one another via the cross-service broker app.

Thus, examples of the present disclosure provide for improved travel and transportation management systems, including booking and reservation systems, fleet management systems, and so forth. In particular, examples of the present disclosure provide for limited sharing of data across applications on an as-needed basis, triggered by an event detection with respect to one aspect of a trip which relates to a given travel service provider and that travel service provider's app. An event may be detected by notification from a server associated with a travel service provider app, or manually by a user. For instance, the user can manually flag a flight delay in the app before it enters the travel service provider's system and is notified to the app by the server. In any case, the event can be shared with the cross-service broker app, which may determine one or more other aspects of travel may be affected, and which may identify the apps of the other travel service provider(s) associated with the one or more other aspects of travel. The cross-service broker app may then share data as appropriate, and may also take automated actions (e.g., submit requests) via one or more of the travel service provider apps, including the one associated with the event, or others that may be affected. The actions of the cross-service broker app may be fully automated actions, or may take user inputs or interact with a user via a user dialog and then execute across two or more travel service provider apps. In one example, travel service provider apps can drop out, or be dropped from a group of travel service provider apps among which data may be shared, when the cross-service broker app detects that a travel service provider is no longer relevant to the remainder of the trip. In addition, the user may manually cause apps to be dropped out by way of input via a user interface. These and other aspects of the present disclosure are described in greater detail below in connection with the examples of FIGS. 1-5.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102 (e.g., a telecommunication network of a telecommunication service provider). The network 102 may be in communication with one or more access networks 120 and 122, and the Internet (not shown). In one example, network 102 may combine core network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video-on-demand (VoD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an Institute of Electrical and Electronics Engineers (IEEE) 802.11/Wi-Fi network and the like), cellular access networks, $3^{rd}$ party networks, and the like. For example, the operator of network 102 may provide a broadband Internet access service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental, or educational institution LANs, and the like.

In one example, the access networks 120 may be in communication with one or more devices, e.g., device 110. Similarly, access networks 122 may be in communication with one or more devices, e.g., servers 114 and 116, DB(s) 115 and 117, etc. Access networks 120 and 122 may transmit and receive communications between device 110, servers 114, servers 116, DB(s) 115 and 117, application server (AS) 104, database (DB) 106, and/or other components of network 102, devices reachable via the Internet in general, and so forth. In one example, device 110 may comprise any single device or combination of devices that may comprise an endpoint device, e.g., a client device or user device. For example, device 110 may comprise a mobile computing device, e.g., a cellular smart phone, a laptop, a tablet computer, a wearable computing device such as a smart watch or smart eyeglasses, or the like, or may comprise a desktop computer, a server hosting a virtual desktop or the like, and so forth.

In one example, device 110 may be associated with a user 140, e.g., a user of a cross-service broker service. For instance, device 110 may have a cross-service broker application (app) 190 installed thereon, which may provide a single point of contact and interface for user 140 to manage aspects of a trip that may involve a plurality of different travel service providers, each of which may have an associated application that is also installed and available on the device 110, e.g., travel service provider apps 181-186. In one example, device 110 may include one or more radio frequency (RF) transceivers (as well as antenna(s), and/or other components) for cellular communications and/or for non-cellular wireless communications, such as for IEEE 802.11 based communications, IEEE 802.15 based communications, and so forth.

Figure 4:
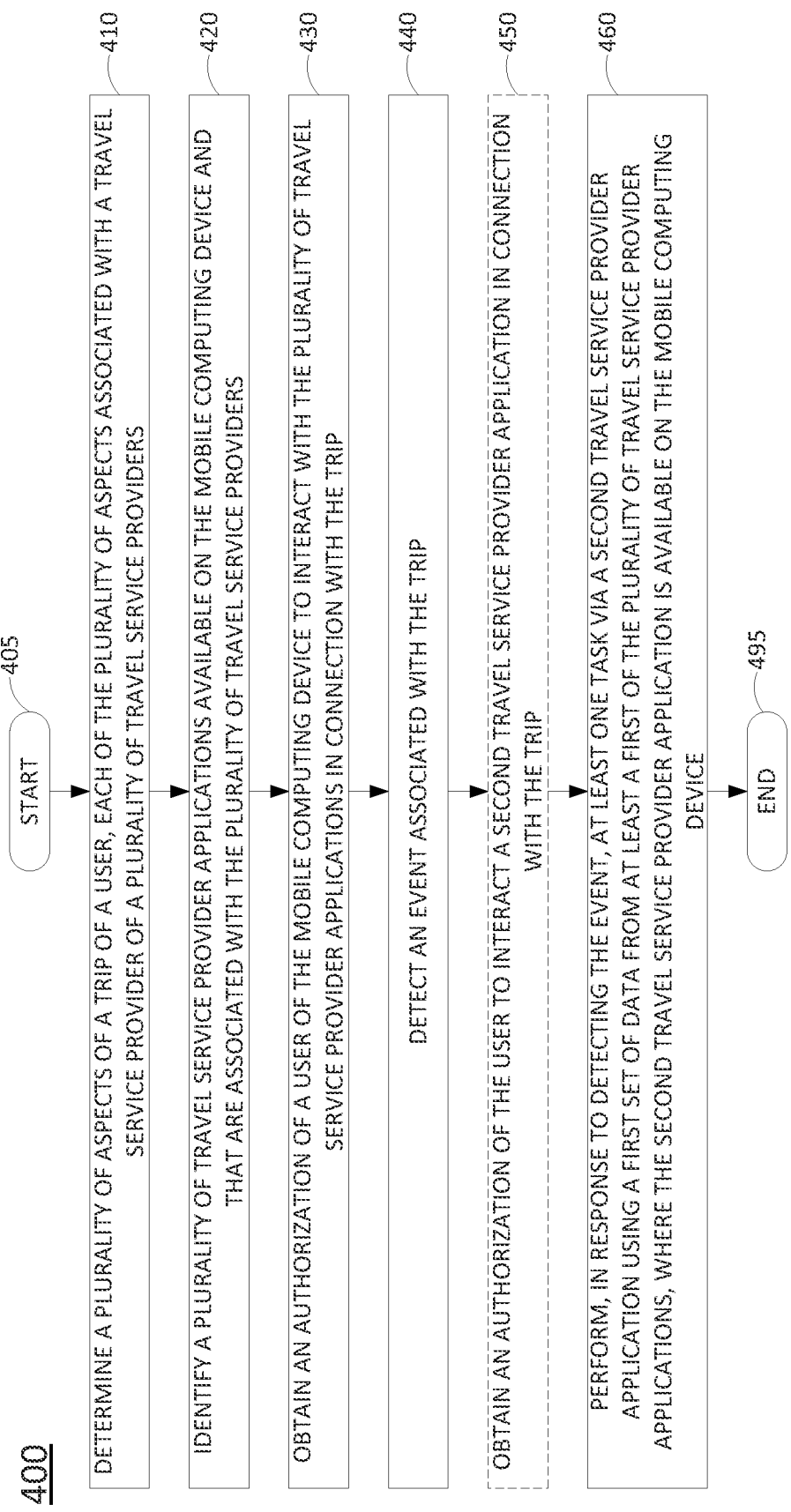
FIG. 4 illustrates a flowchart of an example method for performing at least one task via a second travel service provider application using a first set of data from at least a first travel service provider application available on a mobile computing device of a user in response to detecting an event associated with a trip of the user.
Figure 5:
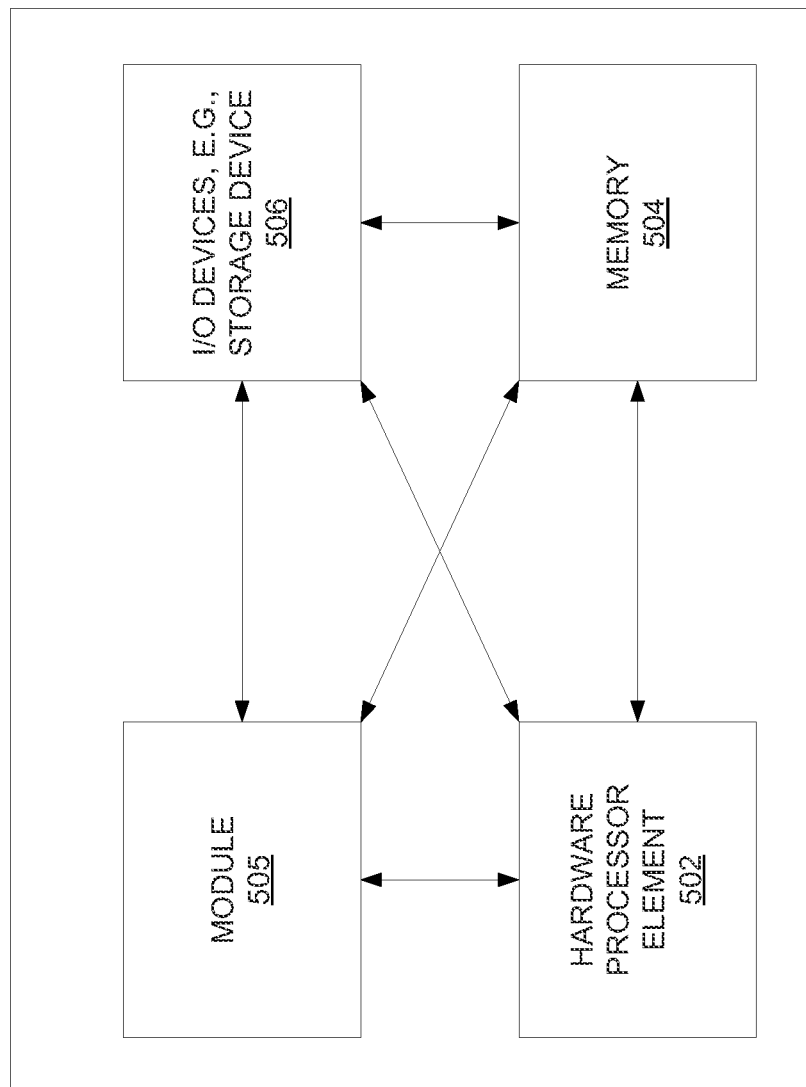
FIG. 5 illustrates a high level block diagram of a computing device specifically programmed to perform the steps, functions, blocks and/or operations described herein.

In one example, device 110 may comprise a computing device or processing system, such as computing system 500 depicted in FIG. 5, and may be configured to provide one or more operations or functions in connection with examples of the present disclosure for performing at least one task via a second travel service provider application using a first set of data from at least a first travel service provider application available on a mobile computing device of a user in response to detecting an event associated with a trip of the user. A flowchart of an example method 400 for performing at least one task via a second travel service provider application using a first set of data from at least a first travel service provider application available on a mobile computing device of a user in response to detecting an event associated with a trip of the user is illustrated in FIG. 4 and discussed in greater detail below.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 5 and discussed below) or multiple computing devices collectively configured to perform various steps, functions, and/or operations in accordance with the present disclosure.

Similarly, server(s) 114 may each comprise a computing system or server, such as computing system 500 depicted in FIG. 5, and may be configured to perform operations in connection with examples of the present disclosure for performing at least one task via a second travel service provider application using a first set of data from at least a first travel service provider application available on a mobile computing device of a user in response to detecting an event associated with a trip of the user, e.g., as described in connection with FIG. 4. For instance, server(s) 114 may comprise server-side program, logic, instructions, data and so forth for travel service provider applications 181-186 associated with travel service providers 171-176. For instance, travel service providers 171-176 may comprise an airline, a ground transportation provider (e.g., a bus service, a train service, a taxi or ride-share service, etc.), a hotel provider, a food service provider (e.g., a restaurant chain, etc.), an entertainment provider (e.g., a sports or concert venue, a comedy club, or a booking agent operating on behalf of such entities), a beverage vendor (e.g., a coffee shop chain, or the like), and so forth. It should be noted that these are just several examples of various travel service providers and that such categories are provided for illustrative purposes only. For instance, a beverage vendor may also comprise a food service provider (e.g., a fast food chain that also offers coffee, tea, soda, or other beverages).

In one example, database(s) 115 may represent a plurality of different distributed file systems, e.g., a Hadoop® Distributed File System (HDFS™), or the like associated with each of the travel service providers 171-176. Server(s) 114 may receive and store information in database(s) 115 relating to different users, such as users 140 (although only one user is illustrated in FIG. 1, it should be understood that this user can be representative of multiple users), and with respect to the different travel services. For instance, users 140 may register with and opt-in to use travel service provider apps 181-186 provided by travel service providers 171-176, e.g., via server(s) 114. In one example, server(s) 114 may establish communications with user devices, such as device 110 periodically or on another basis to obtain and update all or a subset of the information maintained in database(s) 115 relating to users of the respective travel service provider apps 181-186.

Database(s) 115 may also store information relating to the respective travel services of travel service providers 171-176. For instance, travel service provider 171, e.g., an airline, may store in DB(s) 115 information regarding flight/aircraft statuses, schedules, information relating to whether the aircraft is on-schedule or delayed, e.g., a current location, fuel status, aircraft amenities (e.g., seating arrangements, WIFI connectivity, entertainment options, and so on), etc. For instance, one or more of server(s) 114 in conjunction with one or more of DB(s) 115 may comprise a suite of airline management systems, e.g., an airline reservation and booking system, an airline flight management system, etc. Similarly, travel service provider 172, e.g., a ground transportation provider, such as a ride-share service, may store fleet information, such as types of vehicles, their capacities, in-use/vacant statuses, current locations, user/pickup locations, estimated cost per ride, and so forth.

As illustrated in FIG. 1, one or more servers 116 may each comprise a computing system or server, such as computing system 500 depicted in FIG. 5, and may be configured to perform operations in connection with examples of the present disclosure for performing at least one task via a second travel service provider application using a first set of data from at least a first travel service provider application available on a mobile computing device of a user in response to detecting an event associated with a trip of the user, e.g., as described in connection with FIG. 4. For instance, server(s) 116 may comprise server-side program, logic, instructions, data and so forth for cross-service broker app 190.

In one example, database(s) 117 may represent distributed or centralized file systems, e.g., a HDFS™, or the like associated with the cross-service broker app 190. For instance, server(s) 116 may receive and store information in database(s) 117 relating to different users, such as users 140, and with respect to the different travel services. For example, server(s) 116 may store and update a travel itinerary for a trip of user 140, may store permissions of user 140 for cross-service broker app 190 to interact with various travel service provider apps 181-186 on device 110, may store a name, username, address, current location, billing and account information, and/or other data regarding user 140, and so forth.

In one example, AS 104 may comprise a network-based server (or servers) providing a network-based infrastructure of cross-service broker app 190. In this regard, AS 104 may comprise the same or similar components as server(s) 116 and may provide the same or similar functions, or at least a portion thereof. For instance, an operator of network 102 may provide the cross-service broker app 190, supported via AS 104 in accordance with the present disclosure (e.g., in addition to telecommunication services such as TV, phone, internet access, etc., as described above). Accordingly, DB(s) 106 may be the same as or similar to DB(s) 117 and may store the same or similar information. Thus, although the following examples are described primarily in connection with server(s) 116, it should be understood that the descriptions may equally apply to AS 104.

In an illustrative example, user 140 may be commencing a trip having multiple aspects, such as transit legs, scheduled events, and/or scheduled accommodations, and so forth. In one example, the user 140 may book/reserve in advance different aspects of the trip via respective travel service provider apps (e.g., all or a plurality of travel service provider apps 181-186 on device 110). For instance, user 140 may book round trip airline tickets via travel service provider app 181 (e.g., of an airline) and may book a hotel reservation via travel service provider app 183 (e.g., of a hotel). Thus, for example, the travel service provider apps 181 and 183 may communicate with respective servers 114 to cause the reservations to be made and recorded in respective databases 115. In one example, the servers 114 associated with airline 171 may cause physical tickets to be mailed, emails to be sent with tickets to be printed, or data to be downloaded to travel service provider app 181 which may cause an electronic ticket (e-ticket) to be displayed on a screen of device 110 in response to an input from user 140. Similarly, the servers 114 associated with hotel 173 may cause an email confirmation and/or text confirmation to be sent to user 140 and/or to device 110, a confirmation to be sent to the travel service provider 183 app on device 110, etc.

In one example, user 140 may utilize cross-service broker app 190 in connection with the trip. For instance, user 140 may provide an itinerary for the trip to cross-service broker app 190, or may create the itinerary for the trip via cross-service broker app 190. For example, the user may grant cross-service broker app 190 permission to interact with any or all of the travel service provider apps 181-186 available on device 110. In one example, cross-service broker app 190 may find existing bookings/reservations with each of the travel service provider apps 181-186 that the user 140 has granted permission to cross-service broker app 190 to interact with. For instance, cross-service broker app 190 may present a list of existing reservations/bookings from which the user 140 may select or provide another input, or inputs, to indicate which reservations/bookings belong to the trip.

Alternatively, or in addition, user 140 may book/reserve in advance different aspects of the trip via cross-service broker app 190, which may be granted authorization by user 140 to interact with any or all of travel service provider apps 181-186 to book/reserve aspects of the trip associated with respective travel service providers 171-176. In this case, cross-service broker app 190 may create and store a trip itinerary, and add to the itinerary as different aspects are booked/reserved. In either example, from the perspective of the travel service provider apps 181-186 and the associated server(s) 114 and DB(s) 115, reservations/bookings are made in accordance with the respective apps.

It should be noted that the interactions of cross-service broker app 190 and the travel service provider apps 181-186 may be in accordance with respective application programming interfaces (APIs) of the travel service provider apps 181-186 that facilitate accessing of data from the travel service provider apps 181-186 (e.g., data stored in DB(s) 115 by the respective server(s) 114 associated with the respective travel service provider apps 181-186). It should be noted that examples of the present disclosure do not use APIs for network-based systems (e.g., implanted by server(s) 114 and/or DB(s) 115) to interact with each other. Thus, each travel service provider app 181-186 can continue to provide its own function, and user 140 may have relationships with each travel service provider 181-186, but the cross-service broker app 190 on device 110 can selectively share data across travel service provider apps 181-186 locally on the device 110 itself, where the travel service provider apps 181-186 may individually interact with their respective network/server-side components (e.g., server(s) 114 and/or DB(s) 115).

In one example, cross-service broker app 190 may also include APIs which facilitate travel service provider apps or other devices, systems, or services to provide push notifications or otherwise engage cross-service broker app 190. However, in one example, no specific configuration of travel service provider apps 181-186 is required and the cross-service broker app 190 may access and interact with the travel service provider apps 181-186 in accordance with the APIs of travel service provider apps 181-186. In one example, the cross-service broker app 190 may operate in accordance with a set of data sharing rules which may limit how data may be shared or utilized across applications, e.g., on an as-needed basis. For example, there is no reason for a hotel (e.g., travel service provider 173) at a travel destination to know that the user 140 has engaged a ground transportation provider (e.g., travel service provider 172) to bring the user to the departure airport, the time of the pickup, etc. Similarly, there is no reason for an airline (e.g., travel service provider 171) to know that user 140 has a reservation with a food service provider (e.g., travel service provider 174, such as a restaurant) on the fourth night of an eight day trip, the time of the meal, how the user 140 plans to reach the restaurant from the hotel, etc. Thus, the set of data sharing rules may formally define when and how data is accessed and shared, thereby protecting the user's privacy according to the user's preference.

Prior to or during the trip, an event may occur that may cause the cross-service broker app 190 to perform at least one task via a second travel service provider application using a first set of data from at least a first travel service provider application. For instance, the event may comprise a delay in at least one aspect of the trip, a cancellation of at least one aspect of the trip, a change in a location associated with at least one aspect of the trip (e.g., a change in origin or destination of a transit leg of the trip, a change in hotel and/or hotel location, a change in a location of a meal or scheduled event), a change in time associated at least one aspect of the trip, an addition of a new aspect to the trip (or a request for the addition of the new aspect to the trip), and so forth. It should be noted that a scheduled event for the trip may comprise a business meeting, an entertainment event, a dining event, an excursion, etc.

In various examples, the at least one task may thus comprise rescheduling at least one aspect of the trip, cancelling at least one aspect of the trip, or booking/scheduling a new aspect of the trip. For example, an addition of a new transit leg of the trip or a new scheduled event may require rescheduling another aspect of the trip, e.g., a transit leg or another scheduled event. Similarly, a delay in one aspect of the trip (e.g., a flight delay or other transit leg delay) may cause a change in at least one other aspect of the trip (e.g., necessitating the rescheduling of a pickup time for ground transportation, canceling another aspect of the trip (e.g., a meeting or meal that will be missed due to transit delay or the like)), the adding of a new aspect (e.g., adding an overnight stay in a hotel required due to a flight delay/cancellation). The data from at least a first travel service provider application may include time of arrival and/or time of departure information, flight information, hotel and room information, and so forth, which may enable the cross-service broker app 190 to schedule, book, and/or rebook one or more other aspects of the trip for the appropriate time(s) and/or location(s), and so forth.

The second travel service provider application may be included in the travel service provider apps that are already approved for cross-service broker app 190 to interact with, or cross-service broker app 190 may determine that the second travel service provider application should be interacted with in response to the event, e.g., based on the nature and circumstances of the event. For instance, a current itinerary for the trip may not include a hotel, but if an overnight stay becomes required (e.g., due to afternoon flight being delayed until the next morning), the cross-service broker app 190 may request permission from user 140, via device 110, to interact with travel service provider app 183, e.g., of a hotel. Similarly, if the event is a cancellation or delay of a flight, cross-service broker app 190 may request permission from user 140, via device 110, to interact with a travel service provider app of a different airline, e.g., to find an earlier flight that is closer to the originally scheduled flight time. This may be performed as an alternative, or in addition and in parallel to interacting with travel service provider app 183, e.g., of a hotel, to seek overnight accommodations. In the same or similar manner, ground transportation at the destination airport may be rescheduled or canceled, new ground transportation to a hotel may be added, and so forth, such as via travel service provider app 182 associated with a ground transportation provider.

In one example, cross-service broker app 190 may track and monitor when different aspects of the trip are completed. These may be indicated by user 140 by inputs via the cross-service broker app 190 on device 110, or may be indicated by notifications of the travel service provider apps 181-186 to the cross-service broker app 190 or polling of the cross-service broker app 190 to the travel service provider apps 181-186. For instance, when user 140 checks out of a hotel (e.g., of travel service provider 173), the user 140 may indicate this aspect of the trip is completed and/or a notification from travel service provider app 183 may indicate the same or similar information. As such, this event may cause cross-service broker app 190 to revoke the permission for cross-service broker app 190 to interact with travel service provider app 183 in connection with the trip (e.g., cross-service broker app 190 is no longer authorized to access and share data of user 140 from travel service provider app 183 with other travel service provider apps on device 110). Similarly, cross-service broker app 190 may no longer be authorized to access and share data of user 140 from other travel service provider apps with travel service provider app 183 on device 110.

It should be noted that the foregoing is just one illustrative example of how examples of the present disclosure for performing at least one task via a second travel service provider application using a first set of data from at least a first travel service provider application available on a mobile computing device of a user in response to detecting an event associated with a trip of the user may operate. Thus, it should be noted that in other, further, and different examples, aspects described above with respect to server 116 may alternatively or additionally be provided by AS 104. In addition to the foregoing, various other features of the present disclosure may be provided via the system 100.

It should also be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102 and/or access networks 120 and 122 may comprise a content distribution network (CDN) having ingest servers, edge servers, and the like. Similarly, although only two access networks 120 and 122 are shown, in other examples, access networks 120 and/or 122 may each comprise a plurality of different access networks that may interface with network 102 independently or in a chained manner. For example, server(s) 114 and server(s) 116 may reach network 102 via different access networks, and so forth. Thus, these and other modifications are all contemplated within the scope of the present disclosure.

To further illustrate aspects of the present disclosure, FIG. 2 depicts an example of stable data 205 and transient data 210 in a user record 200 of a user associated with a travel service provider application. For example, the user record 200 may be stored in connection with a particular user/traveler of an airline. For instance, in the example of FIG. 2, stable data 205 may include fields for a name of the user, a traveler number (e.g., a frequent flyer number or the like), credit card information, emergency contact information, a seating preference, a home and/or a mailing address, a phone number, and an email address. In addition, in the example of FIG. 2, transient data 210 may include fields for a flight number, a date of the flight, an origin airport, and a destination airport, a departure time, an arrival time, a departure gate, a baggage claim number, and a seat number. It should be noted that as shown in FIG. 2, the fields of the stable data 205 and transient data 210 are illustrative only in nature and may include more or less fields, different field names and/or different data contained therein, and so forth. For instance, the stable data may further include communication preferences of the user (e.g., mail, text, email, in-app notification, etc.), a loyalty status, meal restriction information, and so forth. Similarly, transient data 210 may alternatively or additionally include information on a reservation number, associated reservation numbers (e.g., of traveling companions in a same party), a ticket number, a ticket/seat class, and so on.

It should be further noted that stable data and transient data of different travel service providers may be the same or similar as that which is illustrated in FIG. 2, but may include more or less fields, different fields, and so forth, e.g., depending upon the nature of the particular travel service provider. For instance, a user record associated with a lodging provider/hotel does not necessarily store departure gate and baggage claim data, but may include in the stable data a room type preference, a loyalty status, etc., and may include in the transient data a room number, a check-in date, a check-out date, a check-in time, a check-out time, amenities reserved and/or used by the user (e.g., daily breakfast for an additional charge, usage of a spa, reservation of a conference room), etc. In still another example, transient data in a user record of a ride-share service may include user location information, an estimated pickup time, an estimated time to arrive at the destination, an identifier of a vehicle assigned to the user, and so forth (e.g., for when there is a pending ride that has been arranged or is in progress; otherwise, the transient data may be null or be set to default or reset values). Thus, these and other modifications are all contemplated within the scope of the present disclosure.

Figure 3:
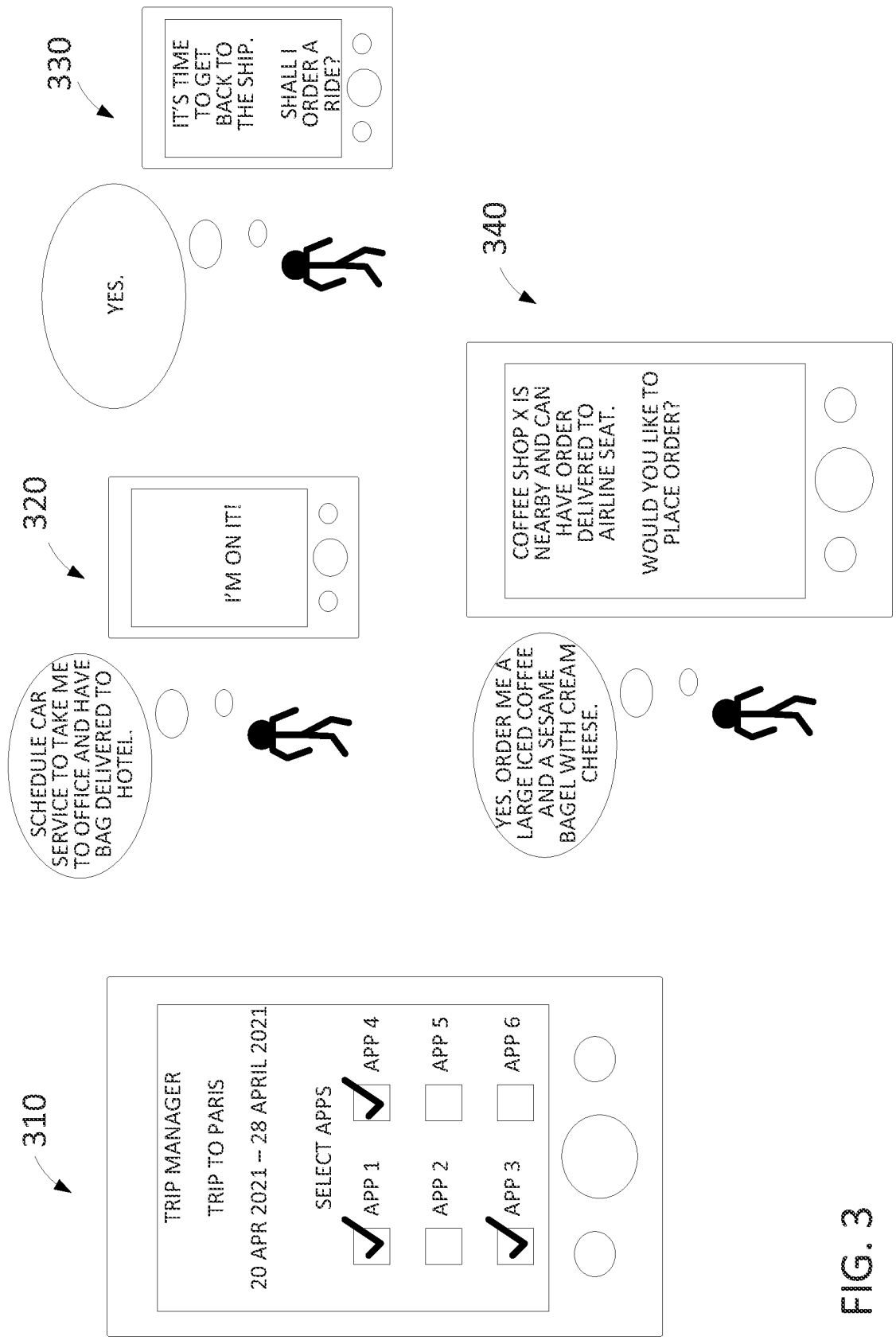
FIG. 3 illustrates example scenarios associated with a user interface of a cross-service broker application, in accordance with the present disclosure.

FIG. 3 illustrates example scenarios 310-340 associated with a user interface of a cross-service broker application, in accordance with the present disclosure. In example scenario 310, a user interface of the cross-service broker application may present a permission screen relating to a trip of a user to Paris from April 20-Apr. 28, 2021. The screen may present options for the user to select which travel service provider apps the cross-service broker application is permitted to interact with in advance of and/or during the course of the trip. For instance, in the present example, the user may select to grant permission to the cross-service broker app to interact with travel service provider apps 1, 3, and 4 (e.g., to selectively share data between and among the apps according to a rule set or to utilize data from one or more apps to perform task via other one or more of the apps). Alternatively, the user may simply select an option that allows the cross-service broker app to interact with any and all travel service provider apps, as the cross-service broker app deems necessary during the trip.

Scenario 320 illustrates that a user may invoke the cross-service broker app via a voice interface, e.g., using a voice command such as "schedule car service to take me to office and have bag delivered to hotel." The cross-service broker app may generate an audible response via the user device, such as "I'm on it!," or may alternatively or additionally display the same or a similar response via a display screen of the user device. In one example, this command may comprise an event associated with the trip that may cause the cross-service broker app to perform a task via a second travel service provider application using a first set of data from at least a first travel service provider application. For instance, the cross-service broker application may access data from an app of an airline to obtain flight information of the user, e.g., arrival airport, arrival time, etc., which may then be used to arrange for the car service at the appropriate time and location. Similarly, the cross-service broker application may access data from an app of the hotel to obtain the hotel address, procedures/instructions for luggage delivery on behalf of guests, etc. The cross-service broker app may then access the airline app (e.g., via an airline app API) to initiate an instruction to deliver the user's luggage to the hotel at which the user has a reservation. In addition, the cross-service broker app may provide information to the hotel, via the hotel app, to expect delivery of luggage items of the user at a particular time and from the particular airline. Thus, in this case, some of the information via the hotel app is shared with the airline app to facilitate the request of the user, and vice versa, but such information sharing is performed locally via the user endpoint device.

Scenario 330 illustrates an example in which the cross-service broker application continues to monitor progress of a trip, e.g., according to a trip itinerary, and may independently detect events that affect the trip. For instance, prior to a cruise portion of a trip, the cross-service broker application may obtain information from an app of the cruise line regarding debark/embark times at various ports of call, and may record the debark/embark times in an itinerary for the trip, may update the itinerary as any of the debark/embark times may change, etc. Thus, by monitoring the debark/embark times according to the itinerary and by tracking the location of the user via the user device, the cross-service broker application may determine an event affecting the trip, e.g., that the user will miss the embark time if the user does not run on foot or enter a taxi or ride-share vehicle and head to the ship within the next 15 minutes. In this case, the cross-service broker application may query the user as to whether the user would like to have the cross-service broker application order a ride (e.g., via an audible output and/or via a display on a screen of the user device). Continuing with the present example, the user may respond "yes" via a voice command or input via the display screen (e.g., comprising a touch screen interface). In response, the cross-service broker application may access a ride-share service app and generate an order for a pickup at the user's location and a drop-off at the ship (or at the cruise terminal). It should be noted that in such case, the cross-service broker application may access the cruise line app to obtain information on the cruise, e.g., the embark time, the address of the cruise terminal, etc., in which case, some or all of this information may be shared with or otherwise used to arrange for the ride via the ride-share service app. It should also be noted that in one example, the ride-share service app may be an app that the cross-service broker app may already have permission to interact with. However, in the event that the ride-share service app is not already in the set for which the cross-service broker app has permission, the positive response from the user to the offer from the cross-service broker app to order the ride may be taken as the necessary permission or authorization to add the ride-share service app to the set of travel service provider apps that the cross-service broker app is permitted to interact with, and share data across and among, in connection with the trip.

In still another scenario 340, the user may grant a limited permission for the cross-service broker app to interact with a travel service provider app. For instance, the user may grant permission for cross-service broker app to receive certain notifications, such as detecting a proximity of the user device to a relevant location of the travel service provider. For example, the user may separately authorize an app of a coffee shop chain to alert when the user device is nearby to a coffee shop location. In this case, the notification may be intercepted by the cross-service broker app, which may detect an opportunity to add an aspect of the trip associated with the coffee shop, e.g., placing an order and having the order delivered to a departure gate waiting area or even to an airline seat via an airline staff, if permitted. For instance, in this scenario 340, the airline app may separately provide for accepting deliveries from food/drink vendors and facilitating the placement of orders at users' seats, e.g., via an API of the airline app.

Continuing with the present example, the cross-service broker app may present the offer to the user via an audible output and/or via text on a display screen of the user device. Similar to the above examples, the user may accept the offer via voice command or other input. In this case, the user may speak an actual order for the cross-service broker. In this case, the coffee shop app may not previously be part of the group of travel service provider apps among which the cross-service broker app is permitted to access and share data. However, since the user has accepted the offer presented by the cross-service broker app, this may be accepted as permission or authorization of the user to add the coffee shop app to the group of apps. As such, the cross-service broker app may interact with the airline app to obtain flight information, such as the gate number, departure time, seat number, etc., and may interact with the coffee shop app to place the order and to notify of the user's name, the gate number, the departure time, the seat number, etc. Thus, for example, the coffee shop may accept the order via the coffee shop app, which may be forwarded to personnel at the local shop (e.g., within the same airport terminal as the user) to fulfill. The order may include the user's name, the gate number, the departure time, the seat number, etc., such that this information may be written or printed onto the item(s) of the order, a bag or carton containing the item(s), etc. In addition, this information may be used by personnel of the coffee shop to know where and when to bring the order to tender to the airline. Similarly, the cross-service broker app may enter a notification or order via the airline app providing information on the delivery of food and/or beverage items of the user for the flight. For instance, the cross-service broker app may notify the airline via the airline app of an order number and an expected delivery time to the gate where the aircraft may be waiting. In one example, this information may be provided to the personnel of the airline, which may have a designated person or location to accept delivery of food/beverage orders for passengers on the flight (e.g., for an additional fee, or as an included service for some or all classes of tickets). For instance, the airline app on the user device may transmit this information to server(s) of the airline app, which may aggregate a list of orders for a particular flight and present this list for use by airline personnel, e.g., at the gate, such as via a computer terminal at the gate, a tablet computing device or other mobile computing devices carried by the appropriate personnel of the airline, and so forth.

As mentioned above, in one example, permissions to obtain data from and share data with certain travel service provider apps may be revoked as certain milestones or events occur. Thus, for instance, the permission for the coffee shop app may be automatically revoked or expire after the coffee shop indicates via the coffee shop app, that the order has been delivered to the gate, after the cross-service broker app detects via the airline app (and/or via its own location tracking of the user device) that the flight has departed, and so forth. Similarly, in the scenario 330, the permission for the ride-share service app may be revoked or expire when it is detected that the user has arrived back at the cruise terminal, and so on.

FIG. 4 illustrates a flowchart of an example method 400 for performing at least one task via a second travel service provider application using a first set of data from at least a first travel service provider application available on a mobile computing device of a user in response to detecting an event associated with a trip of the user. In one example, the method 400 is performed locally by an endpoint device/user device, such as device 110 of FIG. 1, or any one or more components thereof, or by an endpoint device/user device in conjunction with other devices and/or components of system 100 of FIG. 1. In one example, the steps, functions, or operations of method 400 may be performed by a computing device or processing system, such as computing system 500 and/or hardware processor element 502 as described in connection with FIG. 5 below. For instance, the computing system 500 may represent any one or more components of the system 100 that is/are configured to perform the steps, functions and/or operations of the method 400 (e.g., device 110). Similarly, in one example, the steps, functions, or operations of the method 400 may be performed by a processing system comprising one or more computing devices collectively configured to perform various steps, functions, and/or operations of the method 400. For instance, multiple instances of the computing system 500 may collectively function as a processing system. For illustrative purposes, the method 400 is described in greater detail below in connection with an example performed by a processing system. The method 400 begins in step 405 and proceeds to step 410.

At step 410, the processing system (e.g., of a mobile computing device of a user) determines a plurality of aspects of a trip of a user, each of the plurality of aspects associated with a travel service provider of a plurality of travel service providers.

At step 420, the processing system identifies a plurality of travel service provider applications that are available on the mobile computing device and that are associated with the plurality of travel service providers. For instance, the plurality of travel service provider applications may have APIs which enable the processing system to interact locally with the respective travel service provider applications.

At step 430, the processing system obtains an authorization of a user of the mobile computing device to interact with the plurality of travel service provider applications in connection with the trip. For instance, the authorization of the user to interact with the plurality of travel service provider applications in connection with the trip may comprise an authorization to obtain data from the plurality of travel service provider applications. In addition, in one example, the authorization of the user to interact with the plurality of travel service provider applications in connection with the trip may further comprise an authorization to share the data locally via the mobile computing device according to a set of data sharing rules. For instance, the authorization may not grant permission to share any and all data across travel service provider applications for the duration of the trip, but rather to share data or utilize data across applications on an as-needed basis. For example, there is no reason for a hotel at a travel destination to know when and which ride-share service the user engaged to bring the user to the departure airport. Similarly, there is no reason for an airline to know which restaurant a user is eating at on the fourth night of an eight day trip, the time of the meal, how the user plans to reach the restaurant from a hotel, etc. This as needed approach will protect the user's privacy and will limit the different service providers from gaining information of the user without the user's explicit consent.

Thus, the set of data sharing rules may formally define when and how data is accessed and shared. For instance, when an event is detected, the set of data sharing rules may permit the accessing of data from a travel service provider app of a travel service provider associated with one aspect of the trip to which the event directly relates, or that is impacted by the event. Similarly, the set of data sharing rules may permit sharing or using data from a travel service provider app of a travel service provider associated with an aspect of the trip to which the event directly relates, or that is impacted by the event, with travel service provider apps of any travel service provider associated with another aspect of the trip to which the event directly relates, or that is impacted by the event. An aspect of the trip impacted by the event may be an aspect of the trip preceding or following a directly affected aspect of the trip (where it may directly precede or follow, or may precede or follow intervening aspects of the trip, wherein changes may have a ripple effect that may require moving-up or pushing back start or end times, reservation times, etc. for multiple aspects of the trip, cancelling one or more aspects of the trip, redirecting one or more aspects, and so forth).

At step 440, the processing system detects an event associated with the trip. For instance, the event may be associated with at least one of the plurality of aspects of the trip or a new aspect of the trip. In one example, the processing system may identify that a travel service provider (e.g., a "second" travel service provider) is associated with: the at least one of the plurality of aspects of the trip, a different one of the plurality of aspects of the trip that is impacted by the event, or the new aspect of the trip. In one example, the processing system may also identify a second travel service provider application that is associated with the second travel service provider and that is installed and available on the mobile endpoint device.

In one example, step 440 may comprise obtaining a notification from the at least a first of the plurality of travel service provider applications, wherein the at least a first of the plurality of travel service provider applications is associated with at least one of the plurality of aspects of the trip. In another example, step 440 may comprise obtaining a notification from the second travel service provider application, e.g., where the second travel service provider application is associated with a new aspect of the trip. In still another example, step 440 may comprise obtaining a notification from an input of the user via the mobile computing device.

The event may comprise, for example, a delay in at least one of the plurality of aspects of the trip, a cancellation of the at least one of the plurality of aspects of the trip (e.g., a delay or cancellation of a transit leg of the trip, a dinner reservation, a sporting event, concert, or the like, a delay or cancellation of a meeting or conference, etc.). Alternatively, or in addition, the event may comprise a change in time associated with the at least one of the plurality of aspects of the trip (which could include a delay, but could also include a moving-up of a scheduled time for a departure or arrival, a change in time for a pickup (e.g., for a taxi or ride-share), a change in time for a reservation time for a meal, sporting event, concert, meeting, conference, excursion, etc.), a change in at least one location associated with at least one of the plurality of aspects of the trip (e.g., a change in hotels, a different departure or arrival airport, train station, bus terminal, or other transit centers), an addition of a new aspect of the trip (such as a new entertainment or business engagement, a new excursion, a new scheduled meal at a restaurant, a new transit leg, etc.), or a request for the addition of the new aspect to the trip (e.g., the user may instruct the processing system to make a booking/reservation for a new transit leg, entertainment or business engagement, a new scheduled meal, a beverage service order, etc.).

At optional step 450, the processing system may obtain an authorization of the user to interact a second travel service provider application in connection with the trip. For instance, the second travel service provider application may be available on the mobile computing device, but may not be part of the plurality of travel service provider applications. In one example, the second travel service provider application may then be added to the plurality of travel service provider applications after the obtaining the authorization at optional step 450.

At step 460, the processing system performs, in response to the detecting the event, at least one task via a second travel service provider application using a first set of data from at least a first of the plurality of travel service provider applications, wherein the second travel service provider application is available on the mobile computing device. In one example, the second travel service provider application comprises one of the plurality of travel service provider applications. In another example, the second travel service provider application is added to the plurality of travel service provider applications in response to the authorization obtained at optional step 450. In one example, the first set of data from the at least the first of the plurality of travel service provider applications is obtained in accordance with the authorization obtained at step 430 for accessing and sharing the data from the plurality of travel service provider applications across the plurality of travel service provider applications. In one example, the obtaining of the first set of data may be in accordance with the set of data sharing rules, such that the first set of data is only obtained and utilized/shared across travel service provider applications on an as-needed basis.

The at least one task may comprise, for example, rescheduling at least one aspect of the trip, cancelling the at least one aspect of the trip, or booking/scheduling a new aspect of the trip. For instance, a delay event associated with one aspect of the trip may cause the processing system to initiate a change in at least one other aspect of the trip (e.g., re-schedule a pickup time, cancel another aspect of trip, add a new aspect (e.g., adding an overnight stay in a hotel required due to a flight delay), etc.). Similarly, a cancellation event may cause the processing system to initiate a change in at least one other aspect of the trip (e.g., re-schedule a pickup time, cancel another aspect of trip, add a new aspect (e.g., adding an overnight stay in a hotel required due to a flight delay), etc.).

In one example, the cancellation event may also cause the processing system to rebook with a travel service provider most directly associated with the event, but in another example could include determining a need to interact with other travel service provider applications that are not in the plurality (e.g., a different airline, or the like). In another example, a change in location event may cause the processing system to make a change in another aspect of the trip via the second travel service provider application (e.g., a change in origin or destination for a transit leg, or a change in a location of an accommodation, etc.). Similarly, the addition of a new aspect, a change in location, and so forth may cause the processing system to seek to reschedule another aspect of trip, e.g., a transit leg or scheduled meal, excursion, entertainment engagement, etc., via the second travel service provider application.

The first set of data may include data from an app of an airline such as flight information of the user, e.g., arrival airport, arrival time, etc., which may then be used to arrange for a car service at an appropriate time and location (e.g., via a car service app comprising the second travel service provider app). In another example, the first set of data may comprise data from a hotel app, such as the hotel address, procedures/instructions for luggage delivery on behalf of guests, etc. The processing system may then access an airline app comprising the second travel service provider app to initiate an instruction to deliver the user's luggage to the hotel at which the user has a reservation. In addition, the processing system may provide information to the hotel, via the hotel app to expect delivery of luggage items of the user at a particular time and from the particular airline. Thus, in this case, some of the information via the hotel app is shared with the airline app to facilitate the request of the user, and vice versa. Various other examples, are described and illustrated in connection with scenarios 310-340 of FIG. 3, and elsewhere herein.

Following step 460, the method 400 proceeds to step 495. At step 495 the method 400 ends.

It should be noted that the method 400 may be expanded to include additional steps, or may be modified to replace steps with different steps, to combine steps, to omit steps, to perform steps in a different order, and so forth. For instance, in one example the processing system may repeat one or more steps of the method 400, such as steps 440-460 for additional events preceding or during the trip, steps 410-460 for a different trip, and so on. In one example, step 430 may precede step 410. In one example, the method 400 may be modified to alternatively or additionally include any aspects of the present disclosure described above and/or illustrated in connection with any of FIGS. 1-4. Thus, these and other modifications are all contemplated within the scope of the present disclosure.

In addition, although not expressly specified above, one or more steps of the method 400 may include a storing, displaying and/or outputting step as required for a particular application. In other words, any data, records, fields, and/or intermediate results discussed in the respective methods can be stored, displayed and/or outputted to another device as required for a particular application. Furthermore, operations, steps, or blocks in FIG. 4 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 5 depicts a high-level block diagram of a computing system 500 (e.g., a computing device or processing system) specifically programmed to perform the functions described herein. For example, any one or more components or devices illustrated in FIG. 1, or described in connection with FIGS. 2-4, may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where the hardware processor element 502 may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for performing at least one task via a second travel service provider application using a first set of data from at least a first travel service provider application available on a mobile computing device of a user in response to detecting an event associated with a trip of the user, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 502 is shown, the computing system 500 may employ a plurality of hardware processor elements. Furthermore, although only one computing device is shown in FIG. 5, if the method(s) as discussed above is implemented in a distributed or parallel manner for a particular illustrative example, e.g., the steps of the above method(s) or the entire method(s) are implemented across multiple or parallel computing devices, then the computing system 500 of FIG. 5 may represent each of those multiple or parallel computing devices. Furthermore, one or more hardware processor elements (e.g., hardware processor element 502) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 505 for performing at least one task via a second travel service provider application using a first set of data from at least a first travel service provider application available on a mobile computing device of a user in response to detecting an event associated with a trip of the user (e.g., a software program comprising computer-executable instructions) can be loaded into memory 504 and executed by hardware processor element 502 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 502) executing the computer-readable instructions relating to the above described method(s) can be perceived as a programmed processor or a specialized processor. As such, the present module 505 for performing at least one task via a second travel service provider application using a first set of data from at least a first travel service provider application available on a mobile computing device of a user in response to detecting an event associated with a trip of the user (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:

determining, by a processing system of a mobile computing device including at least one processor via a first application implemented by the processing system on the mobile computing device, a plurality of aspects of a trip of a user, each of the plurality of aspects associated with a travel service provider of a plurality of travel service providers;

identifying, by the processing system via the first application, a plurality of travel service provider applications that are available on the mobile computing device and that are associated with the plurality of travel service providers;

obtaining, by the processing system via the first application, an authorization of the user of the mobile computing device for the first application to interact with the plurality of travel service provider applications local to the mobile computing device in connection with the trip;

detecting, by the processing system via the first application, an event associated with the trip, wherein the detecting the event comprises obtaining a notification via the first application in accordance with a local communication on the mobile computing device from at least a first travel service provider application of the plurality of travel service provider applications through a first application programming interface that is local to the mobile computing device in accordance with the authorization, wherein each of the plurality of travel service provider applications is implemented by the processing system on the mobile computing device, wherein the processing system via the at least the first travel service provider application accesses the notification from a first travel service provider server of a first travel service provider of the plurality of travel service providers, and wherein the detecting the event further comprises detecting the mobile computing device at a location associated with the at least the first travel service provider application;

selecting, by the processing system via the first application in response to the detecting the event, a first set of data from the at least the first travel service provider application to be shared with a second travel service provider application of the plurality of travel service provider applications; and performing, by the processing system via the first application in response to the selecting, at least one task via the second travel service provider application of the plurality of travel service provider applications that are available on the mobile computing device using the first set of data from the at least the first travel service provider application of the plurality of travel service provider applications, wherein the performing of the at least one task is through a second application programming interface that is local to the mobile computing device.

2. The method of claim 1, further comprising:

obtaining, by the processing system prior to the performing the at least one task, an authorization of the user to interact with the second travel service provider application in connection with the trip.

3. The method of claim 2, wherein the second travel service provider application is added to the plurality of travel service provider applications after the obtaining the authorization of the user to interact with the second travel service provider application in connection with the trip.

4. The method of claim 1, wherein the authorization of the user of the mobile computing device to interact with the plurality of travel service provider applications in connection with the trip comprises an authorization to obtain data from the plurality of travel service provider applications, wherein the data from the plurality of travel service provider applications comprises the first set of data from the at least the first travel service provider application of the plurality of travel service provider applications.

5. The method of claim 4, wherein the authorization of the user of the mobile computing device to interact with the plurality of travel service provider applications in connection with the trip further comprises an authorization to share the data from the plurality of travel service provider applications among the plurality of travel service provider applications according to a set of data sharing rules.

6. The method of claim 1, wherein the event is associated with at least one of the plurality of aspects of the trip or a new aspect of the trip.

7. The method of claim 6, wherein the second travel service provider application is associated with a second travel service provider, wherein the second travel service provider is associated with: the at least one of the plurality of aspects of the trip, a different one of the plurality of aspects of the trip that is impacted by the event, or the new aspect of the trip.

8. The method of claim 6, wherein the at least the first travel service provider application of the plurality of travel service provider applications is associated with the at least one of the plurality of aspects of the trip.

9. The method of claim 1, wherein the event comprises:

a delay in at least one aspect of the plurality of aspects of the trip;

a cancellation of the at least one aspect of the plurality of aspects of the trip;

a change in time associated with the at least one aspect of the plurality of aspects of the trip; or a change in at least one location associated with the at least one aspect of the plurality of aspects of the trip.

10. The method of claim 9, wherein the at least one location comprises:

an origin of a transit leg of the trip;

a destination of the transit leg of the trip;

a location of an accommodation; or a location of a scheduled event.

11. The method of claim 1, wherein the event comprises:

an addition of a new aspect of the trip; or a request for the addition of the new aspect to the trip.

12. The method of claim 1, wherein the at least one task comprises:

rescheduling at least one aspect of the trip;

cancelling the at least one aspect of the trip; or booking a new aspect of the trip.

13. A non-transitory computer-readable medium storing instructions that, when executed by a processing system of a mobile computing device including at least one processor, cause the processing system to perform operations of a first application, the operations comprising:

determining, via the first application, a plurality of aspects of a trip of a user, each of the plurality of aspects associated with a travel service provider of a plurality of travel service providers;

identifying, via the first application, a plurality of travel service provider applications that are available on the mobile computing device and that are associated with the plurality of travel service providers;

obtaining, via the first application, an authorization of the user of the mobile computing device for the first application to interact with the plurality of travel service provider applications local to the mobile computing device in connection with the trip;

detecting, via the first application, an event associated with the trip, wherein the detecting the event comprises obtaining a notification via the first application in accordance with a local communication on the mobile computing device from at least a first travel service provider application of the plurality of travel service provider applications through a first application programming interface that is local to the mobile computing device in accordance with the authorization, wherein each of the plurality of travel service provider applications is implemented by the processing system on the mobile computing device, wherein the processing system via the at least the first travel service provider application accesses the notification from a first travel service provider server of a first travel service provider of the plurality of travel service providers, and wherein the detecting the event further comprises detecting the mobile computing device at a location associated with the at least the first travel service provider application;

selecting, via the first application in response to the detecting the event, a first set of data from the at least the first travel service provider application to be shared with a second travel service provider application of the plurality of travel service provider applications; and performing, via the first application in response to the selecting, at least one task via the second travel service provider application of the plurality of travel service provider applications that are available on the mobile computing device using the first set of data from the at least the first travel service provider application of the plurality of travel service provider applications, wherein the performing of the at least one task is through a second application programming interface that is local to the mobile computing device.

14. A mobile computing device comprising:

a processing system including at least one processor; and a computer-readable medium storing instruction that, when executed by the processing system, cause the processing system to perform operations of a first application, the operations comprising:

determining, via the first application, a plurality of aspects of a trip of a user, each of the plurality of aspects associated with a travel service provider of a plurality of travel service providers;

identifying, via the first application, a plurality of travel service provider applications that are available on the mobile computing device and that are associated with the plurality of travel service providers;

obtaining via the first application, an authorization of the user of the mobile computing device for the first application to interact with the plurality of travel service provider applications local to the mobile computing device in connection with the trip;

detecting, via the first application, an event associated with the trip, wherein the detecting the event comprises obtaining a notification via the first application in accordance with a local communication on the mobile computing device from at least a first travel service provider application of the plurality of travel service provider applications through a first application programming interface that is local to the mobile computing device in accordance with the authorization, wherein each of the plurality of travel service provider applications is implemented by the processing system on the mobile computing device, wherein the processing system via the at least the first travel service provider application accesses the notification from a first travel service provider server of a first travel service provider of the plurality of travel service providers, and wherein the detecting the event further comprises detecting the mobile computing device at a location associated with the at least the first travel service provider application;

selecting, via the first application in response to the detecting the event, a first set of data from the at least the first travel service provider application to be shared with a second travel service provider application of the plurality of travel service provider applications; and performing, via the first application in response to the selecting, at least one task via the second travel service provider application of the plurality of travel service provider applications that are available on the mobile computing device using the first set of data from the at least the first travel service provider application of the plurality of travel service provider applications, wherein the performing of the at least one task is through a second application programming interface that is local to the mobile computing device.

15. The mobile computing device of claim 14, wherein the operations further comprise:

obtaining, prior to the performing the at least one task, an authorization of the user to interact with the second travel service provider application in connection with the trip.

16. The mobile computing device of claim 15, wherein the second travel service provider application is added to the plurality of travel service provider applications after the obtaining the authorization of the user to interact with the second travel service provider application in connection with the trip.

17. The mobile computing device of claim 14, wherein the authorization of the user of the mobile computing device to interact with the plurality of travel service provider applications in connection with the trip comprises an authorization to obtain data from the plurality of travel service provider applications, wherein the data from the plurality of travel service provider applications comprises the first set of data from the at least the first travel service provider application of the plurality of travel service provider applications.

18. The mobile computing device of claim 17, wherein the authorization of the user of the mobile computing device to interact with the plurality of travel service provider applications in connection with the trip further comprises an authorization to share the data from the plurality of travel service provider applications among the plurality of travel service provider applications according to a set of data sharing rules.

19. The mobile computing device of claim 14, wherein the event is associated with at least one of the plurality of aspects of the trip or a new aspect of the trip.

20. The mobile computing device of claim 19, wherein the second travel service provider application is associated with a second travel service provider, wherein the second travel service provider is associated with: the at least one of the plurality of aspects of the trip, a different one of the plurality of aspects of the trip that is impacted by the event, or the new aspect of the trip.

* * * * *